United States Patent [19]

Crace

[11] Patent Number: 5,096,727

[45] Date of Patent: * Mar. 17, 1992

[54] METHOD FOR IMPROVED BARBECUE GRILL COOKING OF FOOD

[75] Inventor: Robert J. Crace, Brentwood, Tenn.

[73] Assignee: Crace Associates, Inc., Ocala, Fla.

[*] Notice: The portion of the term of this patent subsequent to Nov. 29, 2005 has been disclaimed.

[21] Appl. No.: 422,780

[22] Filed: Oct. 17, 1989

Related U.S. Application Data

[63] Continuation of Ser. No. 227,758, Aug. 3, 1988, abandoned.

[51] Int. Cl.$^5$ .............................................. A23B 4/044
[52] U.S. Cl. .................................... 426/314; 426/315; 44/504
[58] Field of Search ............. 44/16 A, 15 C; 426/314, 426/315, 650

[56] References Cited

U.S. PATENT DOCUMENTS 4,190,677  2/1980  Robins .................................. 426/315
4,787,914  11/1988  Crace ........................................ 44/16

Primary Examiner—Joseph Golian
Attorney, Agent, or Firm—Richard E. Jenkins

[57] ABSTRACT

A flavor-imparting powder composition for use with barbecue grills comprising clay and at least one combustible material and which prevents flare-ups and flaming of food juices during grilling.

8 Claims, 1 Drawing Sheet

METHOD FOR IMPROVED BARBECUE GRILL COOKING OF FOOD

CROSS REFERENCE TO RELATED APPLICATIONS

This is a continuation application of application Ser. No. 227,758, filed Aug. 3, 1988, and now abandoned.

TECHNICAL FIELD

The present invention relates generally to the art of grilling meats and other foods on outdoor barbecue grills. More particularly, the present invention relates to a novel powder composition that will impart charcoal flavor to food being cooked on barbecue grills while eliminating the common problem of flare-ups or flaming known to those who grill outdoors.

BACKGROUND ART

Outdoor grilling or barbecuing is an increasingly popular pastime, and amateur outdoor chefs are continually striving to improve grilling techniques so as to enhance the taste and appearance of barbecued food. For example, one endeavor to impart flavor to food being cooked on a gas grill is disclosed in U.S. Pat. No. 4,058,052. Aluminum briquets having liquid-retaining channels or pits are described which allow fat and juices of food being cooked to form a char on the surface of the briquets so as to transmit flavorized vapors to the food being cooked. Unfortunately, the char layer is often difficult to produce, and the amount of flavor transmitted to the food is difficult to control and generally inadequate when contrasted to flavor imparted by charcoal briquets.

It is also known to place wood chips or the like into a bed of burning briquets (charcoal or permanent) so as to produce smoke vapors which will impart a smoky flavor to the food being cooked. See, for example, U.S. Pat. No. 3,338,640. The wood chips, usually made of hickory or oak, tend to burn unevenly and initially produce an overabundance of smoke and little or no smoke in the latter stages of cooking. The chips also have a tendency to produce unwanted flaming which can burn the food being cooked. U.S. Pat. No. 4,102,653 describes a method of treating these wood chips with a combustion inhibiting solution so as to control the flaming and smoke emission rate of the chips. This method suffers from the fact that potentially hazardous chemicals are added to the chips which may be emitted later during the cooking process so as to contaminate the food being cooked.

Another method for producing wood smoke flavor in food cooked on a barbecue grill is explained in U.S. Pat. No. 4,190,677. This technique comprises placing a bed of wood flour between the heat source and the food being cooked so that the wood flour will smolder and emit smoke and vapor which is absorbed by the food. This method is disadvantageous in that the smoke is usually concentrated in one area of the grill and therefore does not provide for even flavoring of the food. Also, the wood flour is flammable and may become ignited due to its close proximity to the heat source, or undesirable "flaming" may occur due to the dripping of grease from the food being cooked into the wood flour bed therebeneath. Ignition of the wood flour will result in burning of food being cooked on the grill.

A need therefore exists for a flavoring substance and technique which provide for the impartation of wood-like flavor to food being cooked on barbecue grills which does not suffer the deficiencies of the methods and devices known in the art.

DISCLOSURE OF THE INVENTION

In accordance with the present invention, any effective flavor-imparting powder composition is provided for placement in a tray or the like over the briquets of a gas or electric grill which overcomes the aforementioned prior art deficiencies. Also, in the alternative, the briquets could be removed from the gas or electric grill and the tray placed directly into contact with the gas flames or electrode of the grill.

The powder composition of the present invention comprises from about 30-80 percent by weight of clay and from about 20-70 percent by weight of at least one combustible flavor producing material. Various types of clays may be employed in accordance with the invention, although it is presently preferred to use either hydrated montmorillonite or ball clay. The combustible flavor producing material may be either a carbonaceous material such as charcoal or coal or a fibrous material such as hickory (and other wood sawdust and chips) as well as spices, spice hulls and nut shells. Also, the present invention contemplates that mixtures of the carbonaceous material and the fibrous material may be combined with the clay.

Accordingly, it is an object of the present invention to provide a powder composition which when placed in a container beneath food being cooked on a gas or electric grill will impart a distinct smoke or wood flavor to the food being cooked.

Another object of the present invention is to provide a powder composition which when placed in a container beneath food being cooked on a gas or electric grill will impart a smoky flavor to the food without causing flaming and resultant burning of the food.

DESCRIPTION OF THE DRAWING

Some of the objects of the invention having been stated, other objects will become evident as the description proceeds, when taken in connection with the accompanying drawing, in which.

BEST MODE FOR CARRYING OUT THE INVENTION

Figure 1:
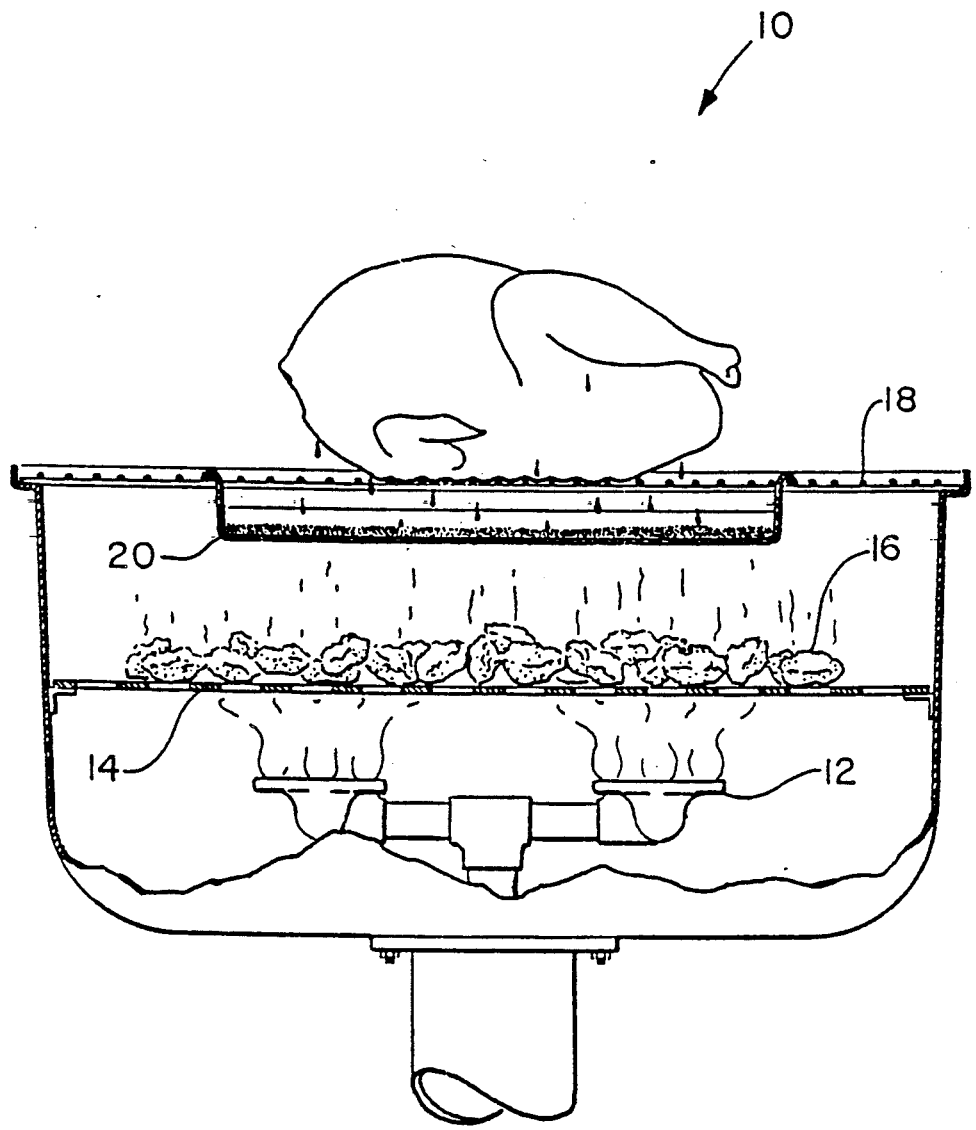
FIG. 1 is a vertical cross-sectional view of a gas barbecue grill having a tray containing the powder composition of the invention mounted below the cooking grid.

The flavor-imparting powder composition of the instant invention comprises from about 30 percent to 80 percent by weight of clay and from about 20 percent to 70 percent by weight of at least one combustible flavor producing material. The clay may be of a number of types including hydrated montmorillonite, Western bentonite, kaolinite, and ball clay. The combustible flavor producing material may be a carbonaceous material such as charcoal, lignite coal or anthracite coal, or mixtures thereof. Also, the combustible material may be a fibrous material such as oak, hickory, mesquite, maple, alder, cherry, and sassafras wood in addition to spice hulls, nut shells, spices, and mixtures of all of the foregoing fibrous materials. The combustible flavor producing material of the powder of the instant invention may also be a mixture of the aforementioned carbonaceous material and fibrous material.

A preferred flavor-imparting powder composition consists essentially of hydrated montmorillonite clay, charcoal derived from hickory wood, and hickory wood sawdust or chips wherein the clay comprises at least 50 percent by weight of the composition. The powder compositions are produced by grinding or milling the clay and the combustible materials into a fine powder and then admixing the ingredients according to the desired composition. Two preferred powder compositions are set forth below in Examples 1 and 2 to provide a better understanding of the invention.

EXAMPLE 1

|  | Weight Percent |
| --- | --- |
| Clay (Hydrated Montmorillonite) | 55% |
| Charcoal | 20% |
| Hickory Wood | 15% |
| Sodium Nitrate | 10% |

EXAMPLE 2

|  | Weight Percent |
| --- | --- |
| Clay (Hydrated Montmorillonite) | 55% |
| Charcoal | 10% |
| Mesquite Wood | 35% |
| Sodium Nitrate | 10% |

It is possible to substitute for any of these preferred elements from the substitutes therefor set forth above and to vary the weight percentages. However, the preferred compositions described above are believe to be particularly effective in producing flavor to meat or other food being cooked on a barbecue grill and in preventing any "flaming" or "flare-ups" which can result in burning of the food being cooked.

For a better understanding of the invention, a typical chemical composition (moisture free) of one preferred clay, hydrated montmorillonite, is set forth below:

| Silica | 56.00–59.00% | as $SiO_2$ |
| --- | --- | --- |
| Alumina | 18.00–21.00% | as $Al_2O_3$ |
| Iron (Ferric) | 5.00–8.50% | as $Fe_2O_3$ |
| Iron (Ferrous) | 0.37–0.65% | as $FeO$ |
| Magnesium | 3.00–3.30% | as $MgO$ |
| Sodium & Potassium | 0.84–1.25% | as $Na_2O$ |
| Calcium | 1.20–3.50% | as $CaO$ |
| Titanium | 0.80–0.86% | as $TiO_2$ |
| Carbon | 0.45–1.20% | as $CO_2$ |
| Sulfur | 0.09–0.16% | as $SO_2$ |
| Crystal Water | 5.00–6.00% | as $H_2O$ |

Montmorillonite clay is represented by the chemical formula $Al_2O_3\ 4SiO_2\ H_2O$ and can be obtained from a number of suppliers (including Edward Lowe Industries, Inc., of South Bend, Ind.) in a form which can be ground or milled to create the powder composition of the instant invention. The moisture content of the montmorillonite clay as shipped from the supplier is about 5 to 10 percent.

In addition to the previously described elements, the powder composition also preferably includes about 2 to 10 percent by weight of sodium nitrate (see Examples 1 and 2) or other suitable oxidizing agent. The sodium nitrate or other oxidizing agent serves to facilitate the smoldering or smoking of the combustible material contained within the powder composition.

Referring now specifically to FIG. 1, a gas barbecue grill 10 is shown comprising a gas burner 12 having a support grid 14 and permanent briquets 16 positioned thereon which may be either lava rock or cement briquets as known to those familiar with barbecue gas grills. A cooking grid 18 is positioned across the top of grill 10 for supporting food being barbecued thereon, and powder tray 20 containing the powder composition of the invention is secured thereto and extends beneath the majority of the cooking surface of cooking grid 18.

In the method of the invention, the powder composition is placed into the powder tray 20, and gas burner 12 is ignited so as to cause the combustible material within the powder composition to smoke or smolder. The powder can be placed in tray 20 in any manner but is preferably arranged in an even layer having a thickness ranging from about 0.50 to 2.0 inches. Smoke emanating upwardly from the smoldering powder composition is evenly distributed over food placed on cooking grid 18 due to the large surface area of powder tray 20, and grease drippings from food being cooked tend to be absorbed by the clay within the smoke-imparting powder composition.

More specifically, it has been found that the large amount of clay in the present composition acts to capture any grease drippings from good being cooked so as to prevent "flaming" and "flare-ups" which are undesirable since they tend to bun the food being grilled. The clay also acts to buffer the combustible material and prevent the emanation of harsh or bitter smoke vapors that can be created with a totally combustible powder. The partially combustible powder composition of the instant invention therefore eliminates "flare-ups" while providing a smooth and pleasing smoking flavor to food being cooked.

It should be noted that although FIG. 1 depicts a gas barbecue grill with lava rock therein, the powder composition and method of the present invention can be utilized with a gas or an electric grill both with and without lava rocks or cement briquets. If used with lava rock, the powder tray can be placed directly on the lava rock or suspended from the cooking grid as shown in FIG. 1. If used without lava rock or cement briquets, the powder tray can be placed directly into contact with the gas flames or the electrode of the gas or electric grill, respectively. Also, the powder tray could be used on a conventional barbecue grill and placed between the charcoal briquets and food being cooked to prevent "flaming" and "flare-up".

It is evident from the foregoing description that suitable changes may be made without departing from the spirit of the present invention, wherefore, it is intended that the patent shall cover, by suitable expression in the following claims, the features of patentable novelty residing in the invention.

I claim:

1. A method for imparting smoky flavor to food being cooked on a barbecue grill having a cooking grid located above a heat source and for preventing "flaming" caused by food drippings through said cooking grid comprising:

positioning a container of partially combustible flavor-imparting powder composition defining a depth between 0.50–2.00 inches between the heat source and the cooking grid so as to extend beneath the major portion of said cooking grid, said flavor-imparting powder composition comprising from about 30 percent to 80 percent by weight of clay, and from about 20 percent to 70 percent by weight of at least one combustible material;

placing the food on the cooking grid located above the heat source;

igniting the heat source so as to thereby also ignite the combustible material in the powder composition and cause it to smolder and impart smoky flavor to the food being cooked; and catching and absorbing grease drippings from at least the major portion of the food being cooked with the clay in the powder composition in the container so as to prevent flaming and flare-ups due to ignition of grease drippings by the combustible material in the powder composition or by the heat source.

2. A method according to claim 1 wherein said clay montmorillonite, bentonite, kaolinite, ball clay and mixtures thereof.

3. A method according to claim 1 wherein said combustible material is a fibrous material selected from the group consisting of oak, hickory, mesquite, maple, alder, cherry, sassafras, spice hulls, nutshells, spices and mixtures thereof.

4. A method according to claim 3 wherein said combustible material includes a carbonaceous material selected from the group consisting of charcoal, coal, and mixtures thereof.

5. A method according to claim 1 wherein the powder composition comprises from about 30 percent to 80 percent by weight of clay, about 20 percent to 70 percent by weight of at least one combustible material, and about 2 to 10 percent by weight of sodium nitrate.

6. A method according to claim 5 wherein said clay is a member selected from the group consisting of montmorillonite, bentonite, kaolinite, ball clay and mixtures thereof.

7. A method according to claim 5 wherein said combustible material is a fibrous material selected from the group consisting of oak, hickory, mesquite, maple, alder, cherry, sassafras, spice hulls, nutshells, spices and mixtures thereof.

8. A method according to claim 7 wherein said combustible material includes a carbonaceous material selected from the group consisting of charcoal, coal, and mixtures thereof.

* * * * *